US012168287B2

(12) United States Patent
Bernhart et al.

(10) Patent No.: US 12,168,287 B2
(45) Date of Patent: Dec. 17, 2024

(54) POWER TOOL

(71) Applicant: Black & Decker Inc., New Britain, CT (US)

(72) Inventors: Daniel Bernhart, Bad Camberg (DE); Tobias Heep, Hadamar-Steinback (DE); Andre Herdling, Oberneisen (DE); Jochen Seipp, Staufenberg (DE); Patrick Walther, Heistenbach (DE); Stefan Gensmann, Frucht (DE)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/176,688

(22) Filed: Mar. 1, 2023

(65) Prior Publication Data

US 2023/0286125 A1 Sep. 14, 2023

(30) Foreign Application Priority Data

Mar. 8, 2022 (GB) ...................................... 2203212

(51) Int. Cl.
*B25D 17/24* (2006.01)

(52) U.S. Cl.
CPC ........ *B25D 17/24* (2013.01); *B25D 2250/041* (2013.01); *B25D 2250/095* (2013.01); *B25D 2250/121* (2013.01); *B25D 2250/371* (2013.01)

(58) Field of Classification Search
CPC .............. B25D 17/24; B25D 2250/041; B25D 2250/095; B25D 2250/121; B25D 2250/371
See application file for complete search history.

(56) References Cited

U.S. PATENT DOCUMENTS 3,603,824 A * 9/1971 Csaki ..................... H02K 5/148 310/239
4,353,425 A * 10/1982 Simpson ................ B25D 17/24 173/210
4,569,125 A * 2/1986 Antl ....................... H02K 5/225 29/469

(Continued)

FOREIGN PATENT DOCUMENTS

EP 1493537 B1 1/2005
EP 1510300 B1 3/2005

(Continued)

OTHER PUBLICATIONS

European Search Report, Jul. 21, 2023 in corresponding EP application No. 23155892.5.

(Continued)

*Primary Examiner* — Thomas M Wittenschlaeger
*Assistant Examiner* — David G Shutty
(74) *Attorney, Agent, or Firm* — Amir R. Rohani

(57) ABSTRACT

A power tool comprises a housing and an inner assembly mounted at least partially within the housing and configured to move between a first position and a second position with respect to the housing. The inner assembly comprises a motor assembly. The power tool also comprises a mounting frame for guiding the inner assembly between the first position and the second position and having a cable guide for guiding at least part of a cable connected between the motor assembly and a component fixed relative to the housing.

12 Claims, 7 Drawing Sheets

(56) References Cited

U.S. PATENT DOCUMENTS

| | | | | | |
|---|---|---|---|---|---|
| 5,942,822 | A * | 8/1999 | Iwata | H01R 39/40 | 310/239 |
| 6,776,245 | B2 * | 8/2004 | Kristen | B25D 17/20 | 173/171 |
| 6,948,570 | B2 * | 9/2005 | Kristen | B25F 5/006 | 173/217 |
| 6,962,211 | B2 * | 11/2005 | Daubner | B25D 17/24 | 173/162.1 |
| 7,802,632 | B2 * | 9/2010 | Kristen | B25D 17/24 | 173/171 |
| 9,498,874 | B2 * | 11/2016 | Gensmann | B25D 9/26 | |
| 9,669,531 | B2 * | 6/2017 | Gensmann | B25D 9/16 | |
| 2004/0108124 | A1 | 6/2004 | Kristen et al. | | |
| 2005/0085124 | A1 | 4/2005 | Kristen et al. | | |
| 2007/0114051 | A1 * | 5/2007 | Ege | B25F 5/006 | 173/217 |
| 2007/0277992 | A1 * | 12/2007 | Fuenfer | B25D 17/24 | 173/210 |

FOREIGN PATENT DOCUMENTS

| | | | | |
|---|---|---|---|---|
| EP | 1787760 | B1 | 5/2007 | |
| JP | 2000254874 | A | 9/2000 | |
| WO | WO-2009068347 | A1 * | 6/2009 | B25F 5/02 |

OTHER PUBLICATIONS

GB Combined Search Examination Report dated, Apr. 20, 2022, in corresponding GB application No. 2203212.2.

GB Search Report Sec 17 dated, Apr. 19, 2022, in corresponding GB application No. 2203212.2.

* cited by examiner

POWER TOOL

CROSS-REFERENCE TO RELATED APPLICATIONS

This application claims priority, under 35 U.S.C. § 119, to UK Patent Application No. GB2203212.2 filed Mar. 8, 2022, which is incorporated herein by reference in its entirety.

FIELD

The present invention relates to a power tool. In particular, the present invention relates to a power tool with an improved cable guide.

DESCRIPTION OF RELATED ART

Some power tools are designed for robust tasks such as demolition, chipping, hammering, hammer drilling, or breaking. One such known power tool is a demolition hammer which comprises a hammer assembly for reciprocally driving a tool bit of the demolition hammer to break up material like concrete. A problem with the demolition hammer and other similar power tools is that the operator and internal components can experience excessive vibrations. If the operator's hands are exposed to prolonged vibrations from the hammer assembly via the housing, then this may cause discomfort and become a problem for the operator to grip the power tool. Furthermore, some of the internal components in the power tool can be damaged due to the vibrations from the hammer assembly.

It is known that demolition hammers and other such power tools can comprise a vibration dampening system between the hammer assembly and the housing. This means that the housing and the handle experiences reduced vibrations from the hammer assembly. One such known arrangement is shown in US 2005/0085124 A1, which is incorporated herein by reference in its entirety, where the electric motor is connected to a cable which is mounted in a conductor channel having a flexible section and a rigid section. The flexible section comprises a curve for guiding the cable and flexes during operation. A problem with this arrangement is that, when the power tool is operating, certain parts of the cable are put under stress due to repeated bending of the aforementioned flexible section, and thus the cable, which overtime degrades the cable in said areas exposed to repeated bending. Eventually such degradation of the cable can cause the power tool to fail. Furthermore, the conductor channel requires a large radius to securely hold the cable in a manner which does not bend the cable too abruptly which increases the volume of the internal components.

SUMMARY

Examples of the present disclosure aim to address the aforementioned problems.

According to an aspect of the present disclosure there is a power tool comprising: a housing; an inner assembly mounted at least partially within the housing and configured to move between a first position and a second position with respect to the housing, the inner assembly comprising a motor assembly; and a mounting frame for guiding the inner assembly between the first position and the second position and having a cable guide for guiding at least part of a cable connected between the motor assembly and a component fixed relative to the housing.

Optionally, the cable guide extends at least partially along the mounting frame.

Optionally, the cable guide is a channel defined by the mounting frame.

Optionally, the cable guide comprises at least one pair of opposing ribs configured to grip the cable.

Optionally, a first pivot part of the mounting frame is pivotally mounted to the housing and a second pivot part of the mounting frame is pivotally mounted to the inner assembly, optionally wherein the first and second pivot parts are located adjacent respective ends of the mounting arm.

Optionally, a cable receiving portion is provided in the mounting frame adjacent to the first pivot part and/or the second pivot part.

Optionally, a first cable receiving portion is provided in the mounting frame at a first position and a second cable receiving portion is provided in the mounting frame at a second position; wherein the first position is closer to the first pivot part than the second position is; and the second position is closer to the second pivot part than the first position is.

Optionally, the first position is provided adjacent the first pivot part of the mounting frame and the second position is provided adjacent the second pivot part of the mounting frame.

Optionally, the mounting frame comprises a first mounting arm mounted to a first side of the inner assembly and a second mounting arm mounted to a second side of the inner assembly, each of the first and second mounting arms having a said cable guide for guiding at least part of a respective said cable.

Optionally, the inner assembly comprises at least one cable restraint configured to restrict movement of a said cable, optionally wherein the at least one cable restraint is mounted on the motor assembly.

Optionally, the at least one cable restraint defines a surface configured to limit movement of a said cable away from the motor assembly.

Optionally, the at least one cable restraint is configured to guide a said cable through a U-shaped bend.

Optionally, the component to which the cable is connected is a motor controller.

Optionally, the motor assembly is operatively coupled to a hammer mechanism connectable to a tool bit, the hammer mechanism configured to drive the tool bit.

Optionally, the power tool is a demolition hammer.

BRIEF DESCRIPTION OF THE DRAWINGS

Various aspects and embodiments of the invention will now be described by way of non-limiting example with reference to the accompanying drawings, in which.

DETAILED DESCRIPTION

Figure 1:
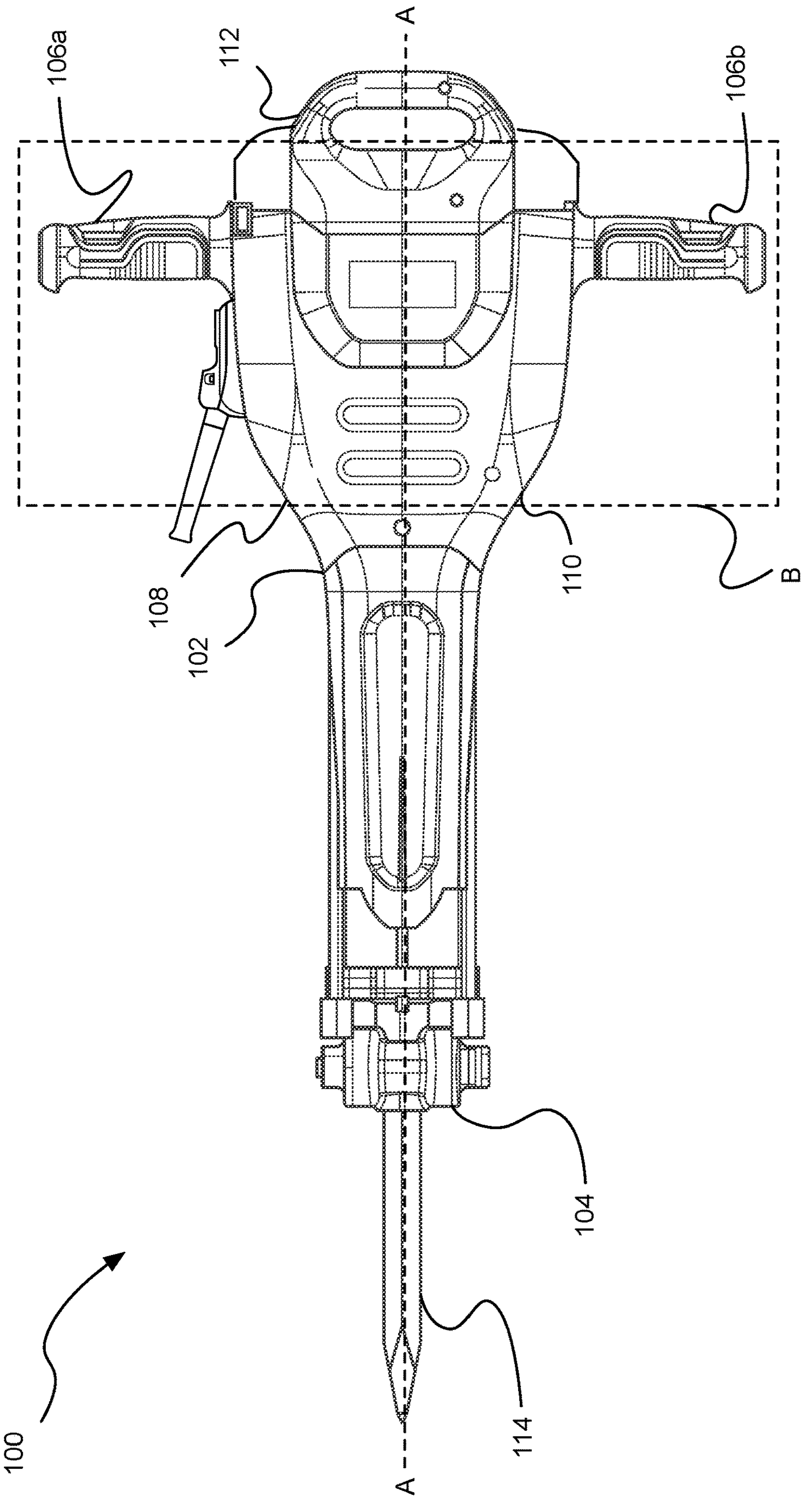
FIG. 1 shows a front view of a power tool according to an example.

FIG. 1 shows a front view of a power tool 100. The power tool 100 as shown in FIG. 1 is a demolition hammer. Whilst FIG. 1 shows a demolition hammer, in other examples any other type of power tool 100 can be used. For example, the power tool 100 can be a plunge saw, a reciprocating saw, a circular saw, an impact driver, a drill, a hammer drill, a multitool, an oscillating tool, a rotary hammer, a chipping hammer, a plate compactor, a rammer, a tamper, a soil compactor, a pavement breaker or any other power tool 100 when a housing 102 is decoupled from an inner assembly 200.

The power tool 100 comprises a housing 102. The housing 102 comprises a clam shell type construction having two halves which are fastened together. The halves of the housing 102 are fastened together with screws but in alternative examples any suitable means for fastening the housing 102 together may be used such as glue, clips, bolts and so on. For the purposes of clarity, the fastenings in the housing 102 are not shown in FIG. 1.

The housing 102 can comprise a unitary element surrounding the internal components of the power tool 100. In other examples, the housing 102 can comprise one or more housing portions (not shown) which are mounted together to form the housing 102.

Figure 2:
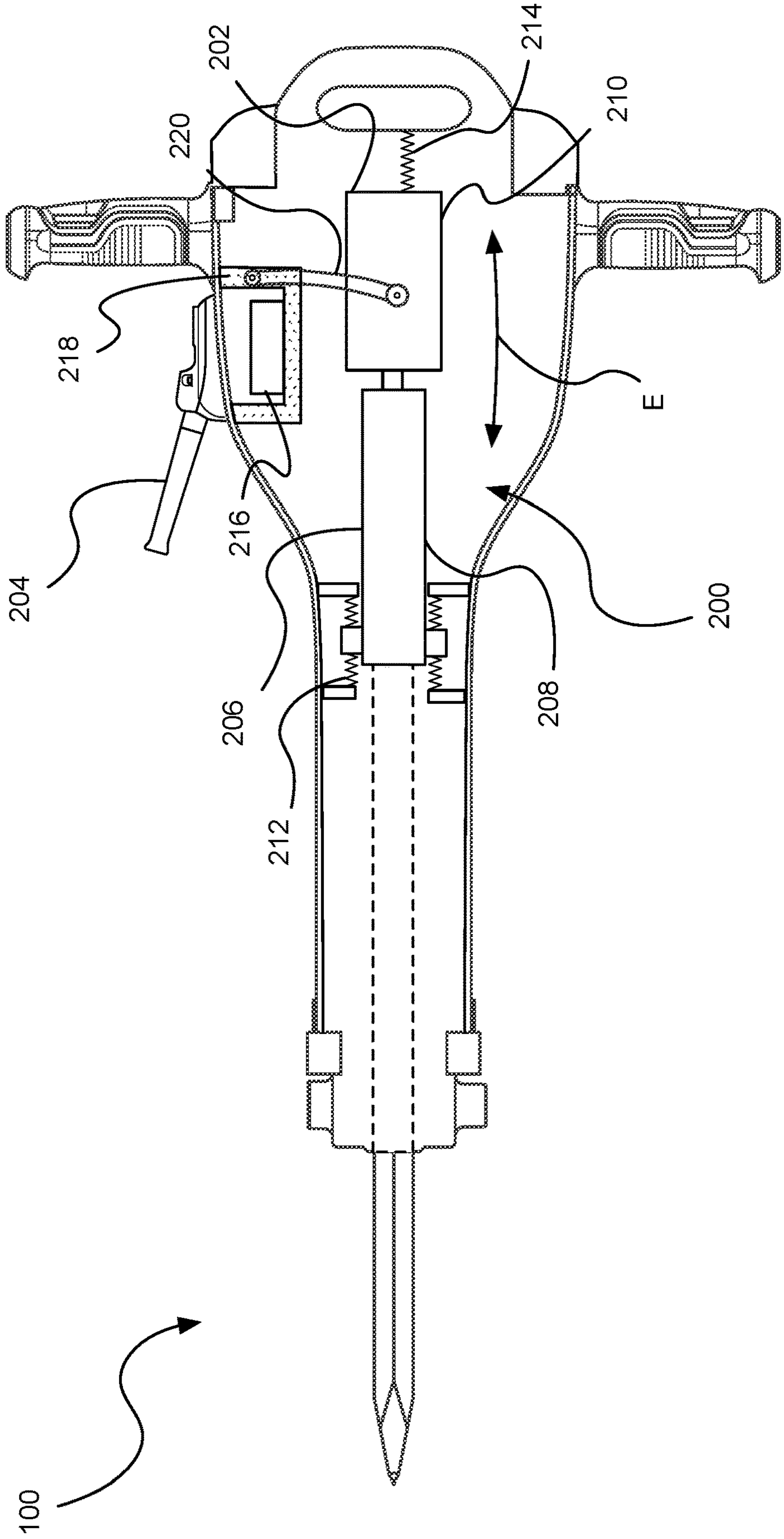
FIG. 2 shows a schematic cross-sectional front view of the power tool according to an example.

The power tool 100 comprises an inner assembly 200 as shown in FIG. 2 which will now be referenced. FIG. 2 shows a schematic cross-sectional front view of the power tool 100.

The inner assembly 200 is moveably coupled within the housing 102. The inner assembly 200 comprises one or more components operatively coupled to a tool holder 104. The inner assembly 200 is configured to move with respect to the housing 102 during operation. This means that the vibrations caused by the power tool 100 can be dampened. The inner assembly 200 and its functionality will be described in more detail below.

As shown in FIG. 1, the housing 102 comprises primary handles **106*a*, 106*b* for each hand of the user. In some examples, the primary handle 106*a*, 106*b* are respectively mounted on a first housing side 108 and a second housing side 110 of the housing 102. Optionally a secondary handle 112 is also provided for the user to grip during use. A trigger button is mounted on or adjacent the primary handle 106*a*, 106*b* or the secondary handle 112 which is used by the user to activate a motor assembly 202 (as shown in FIG. 2**).

The motor assembly 202 is electrically connected to a power source 204. In some examples as shown in FIG. 2, the power source 204 is a wired electrical connection to a mains power supply. Only part of the wired electrical connection is shown in FIG. 2 (and not the entire mains electrical wire). Alternatively in other examples the power source 204 can be a battery pack (not shown), whereby the power tool 100 is wireless. The battery pack can be mounted within the housing 102 or alternatively removably mounted to the housing 102.

The motor assembly 202 is electrically connected to a motor controller 216 mounted within a controller housing 218. The motor controller 216 is configured to issue one or more control instructions to the motor assembly 202 to control speed and direction of the motor. In some examples, the motor is a brushless motor and the motor controller 216 is configured to control the brushless motor. Brushless motors and motor controllers therefor are known and will not be discussed in any further detail. In some other examples, the motor assembly 202 alternatively comprises other types of motor e.g. a brushed motor.

The controller housing 218 is mounted to the housing 102. This means that the controller housing 218 and the motor controller 216 are fixed relative to the housing 102. Accordingly, the inner assembly 200 moves relative to the controller housing 218 and the motor controller 216 during use of the power tool 100.

Figure 7:
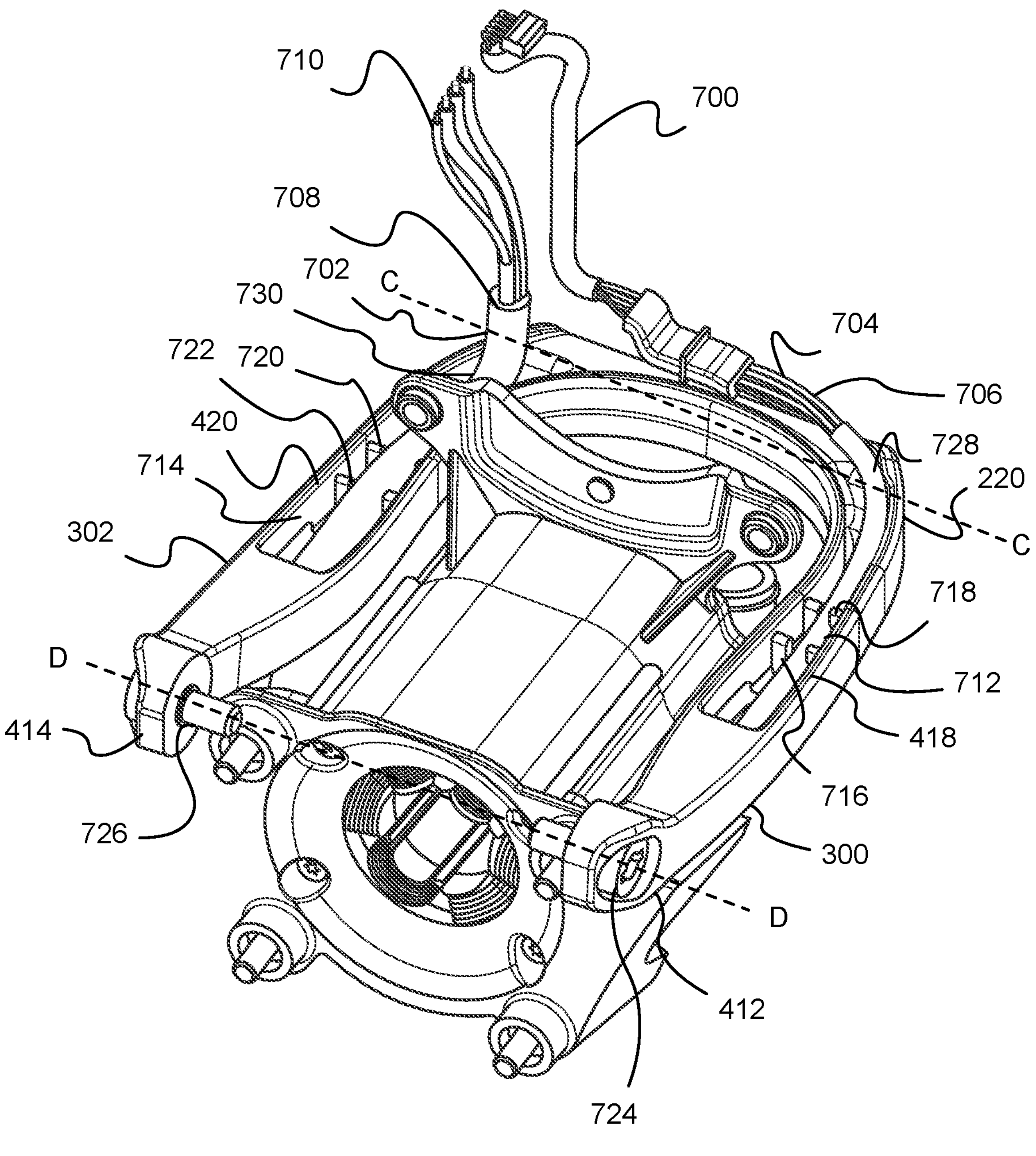
FIG. 7 shows a perspective view of the part of an inner assembly of the power tool according to an example.

The motor controller 216 is connected to the motor assembly 202 with at least one cable 700 (best shown in FIG. 7). FIG. 7 shows a first cable 700 and a second cable 702. The first cable 700 in some examples is a first cable harness 704 comprising a plurality of individual different first wires 706. In some examples, the first cable harness 704 comprises a plurality of data connections between the motor assembly 202 and the motor controller 216. For the purposes of clarity, only one of the plurality of first wires 706 is labelled in FIG. 7. Each of the first wires 706 is configured to transmit signals between the motor assembly 202 and the motor controller 216.

The second cable 702 in some examples is a second cable harness 708 comprising a plurality of individual different second wires 710. In some examples, the second cable harness 708 comprises one or more of power connections between the motor assembly 202 and the motor controller 216. For the purposes of clarity, only one of the plurality of second wires 710 is labelled in FIG. 7. At least some of the second wires 710 are configured to transmit power between the motor assembly 202 and the motor controller 216.

Alternatively, both the first and second cables 700, 702 are configured to transmit both data and power between the motor assembly 202 and the motor controller 216.

The location and path of the first and second cables 700, 702 between the motor assembly 202 and the motor controller 216 will be discussed in more detail below in reference to FIGS. 3 to 7.

Turning back to FIG. 2, the inner assembly 200 will be discussed in more detail. As mentioned above, the inner assembly 200 comprises the motor assembly 202. In addition, the inner assembly 200 also comprises a hammer assembly 206. The motor assembly 202 and the hammer assembly 206 are schematically represented in FIG. 2.

The motor assembly 202 comprises an electric motor (not shown) which is operatively coupled to the hammer assembly 206. The hammer assembly 206 is housed within a hammer assembly housing 208. The hammer assembly 206 is configured to reciprocally drive a tool bit 114 removably connected to a tool holder 104. The tool bit 114 is operatively coupled to the tool holder 104 (as shown in FIG. 1). The hammer assembly 206 generates a reciprocating movement when the motor assembly 202 is actuated. This causes the tool holder 104 and thereby the tool bit 114 to reciprocate. The hammer assembly 206 and the tool holder 104 are known and will not be described in further detail.

Figure 5:
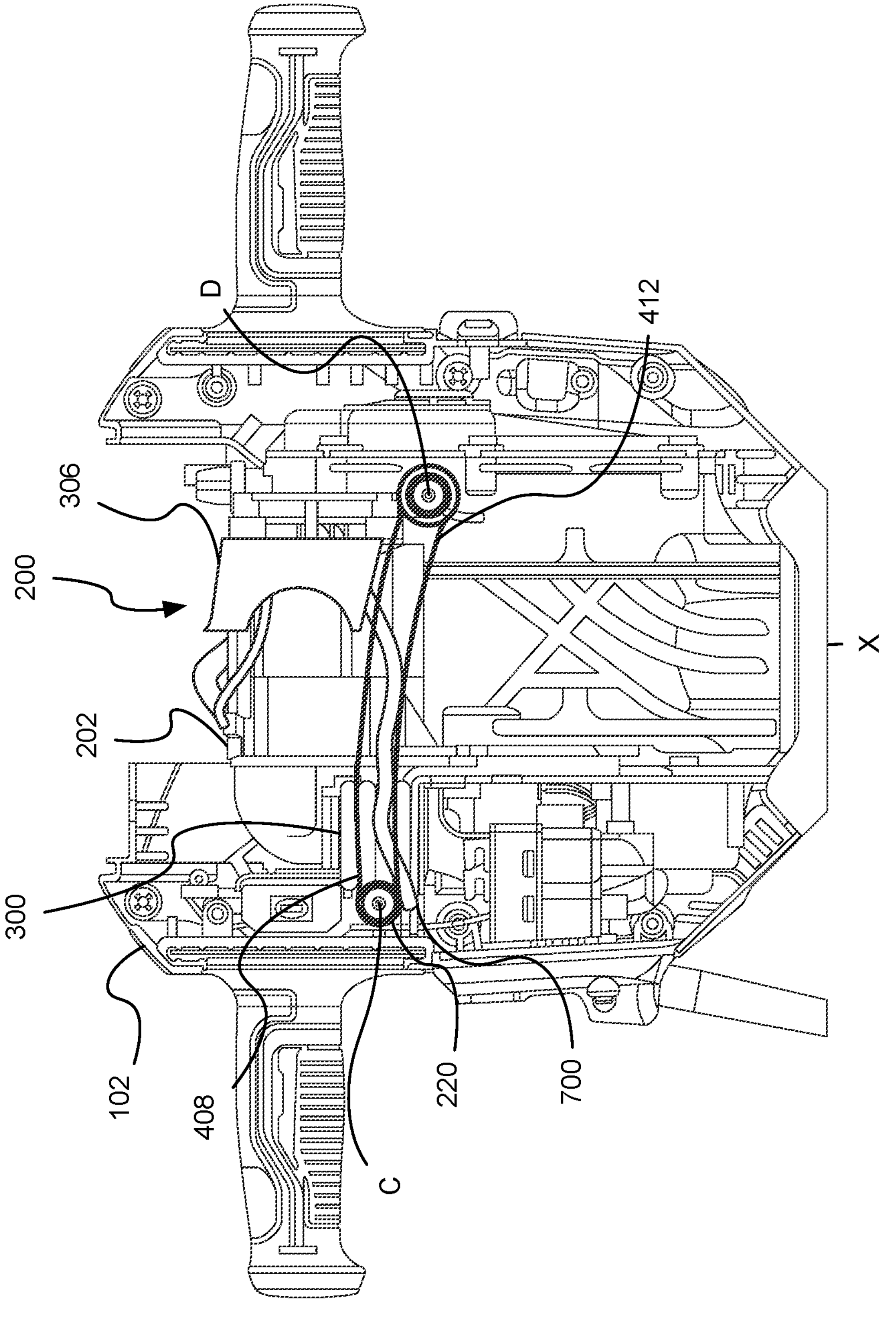
FIG. 5 shows a close-up cross sectional front view of the power tool in a first position according to an example.
Figure 6:
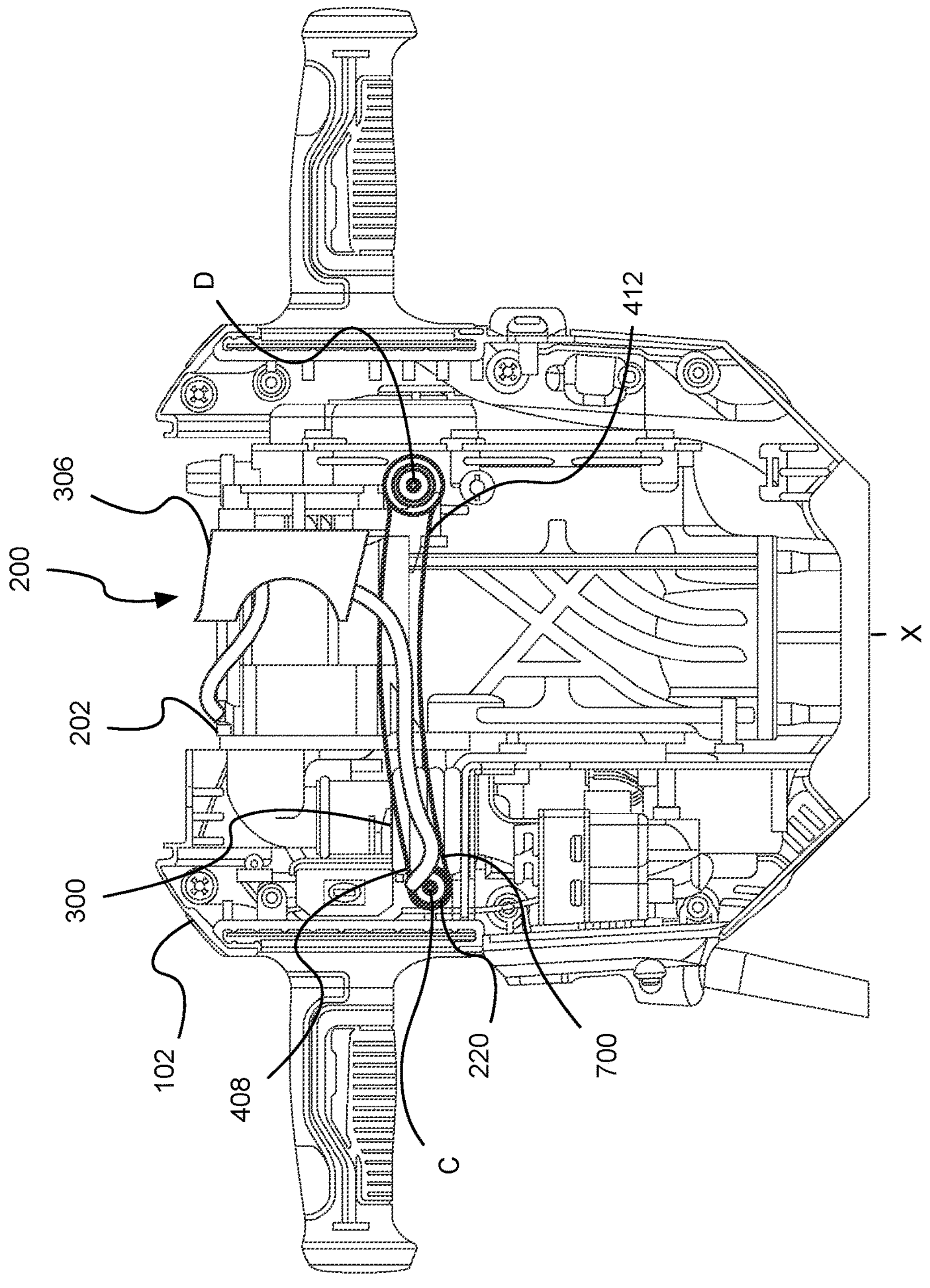
FIG. 6 shows a close-up cross sectional front view of the power tool in a second position according to an example.

The motor assembly 202 is housed within a motor housing 210. The motor housing 210 is coupled to the hammer assembly 206. The motor housing 210 in some examples is fastened directly to the hammer assembly 206. Additionally or alternatively, the inner assembly 200 optionally comprises a rigid frame (not shown) for securing the motor assembly 202 and the hammer assembly 206. The rigid frame can secure additional components thereto so that the inner assembly 200 moves in unison during operation. In some examples, the motor housing 210 and the hammer assembly housing 208 are integral and the motor assembly 202 and the hammer assembly 206 are mounted within the same housing 210 (e.g. as shown in FIGS. 5 and 6).

As shown in FIG. 2 and mentioned above, the motor assembly 202 and the hammer assembly 206 are part of the inner assembly 200 and are moveably mounted within the housing 102. In this way, the inner assembly 200 is arranged to move substantially along a longitudinal axis A-A (as shown in FIG. 1) of the power tool 100. In some examples, the inner assembly 200 is arranged to oscillate along a slightly curved path intersecting with the longitudinal axis A-A. Movement of the inner assembly 200 with respect to the housing 102 will be discussed in further detail with respect to FIGS. 5 and 6 below.

As mentioned above, the hammer assembly 206 is arranged to impart axial impacts to a tool bit 114. In some examples the tool bit 114 is a cutting tool such as a chisel bit for cutting stone, concrete, or other hard surfaces In some examples, the tool bit 114 comprises a longitudinal axis aligned with the longitudinal axis A-A of the power tool 100.

FIG. 2 schematically shows how the inner assembly 200 moves between a first position and a second position within the housing 102 as shown by double ended curved arrow E.

When the hammer assembly 206 impacts the tool holder 104 and thereby transmits impulses to the tool bit 114, vibrations and shocks are created in the power tool 100. In order to prevent or limit excessive transmission of the vibrations to the housing 102 and the internal components of the power tool 100, the power tool 100 comprises a first dampening system 212 and a second dampening system 214. The first and second dampening system 212, 214 are schematically represented in FIG. 2.

The first and second dampening systems 212, 214 comprises optional compression springs mounted between the inner assembly 200 and the housing 102. The compression spring is arranged to be substantially parallel with the longitudinal axis A-A of the power tool 100. Accordingly, when the inner assembly 200 moves with respect to the housing 102 in the direction substantially along the longitudinal axis A-A, the inner assembly 200 does not collide with the housing 102.

The first and second dampening systems 212, 214 are shown as exemplary dampening systems 212, 214. FIG. 2 shows exemplary compression spring arrangements in certain locations between the housing 102 and the inner assembly 200. However, the first and second dampening systems 212, 214 can be alternatively implemented in different ways e.g. with different types of spring or dampening elements located in different positions. For example, the first or second dampening system 212, 214 can optionally comprise additional or alternate dampening components such as rubber dampers, tension springs etc. mounted between the inner assembly 200 and the housing 102.

As shown in FIG. 2, the inner assembly 200 is configured to move between a first position and a second position with respect to the housing 102. The inner assembly 200 is coupled via a mounting frame 220 to the housing 102. The mounting frame 220 is configured to guide the inner assembly 200 between the first position of the inner assembly 200 and the second position of the inner assembly 200, whereby an end of the mounting frame 220 is coupled to the housing 102 and another end of the mounting frame 220 is coupled to the inner assembly 200. FIGS. 5 and 6 respectively show the inner assembly 200 in the first and second positions with respect to the housing 102. The movement of the inner assembly 200 with respect to the housing 102 will be discussed in more detail with respect to FIGS. 5 and 6 below.

Figure 3:
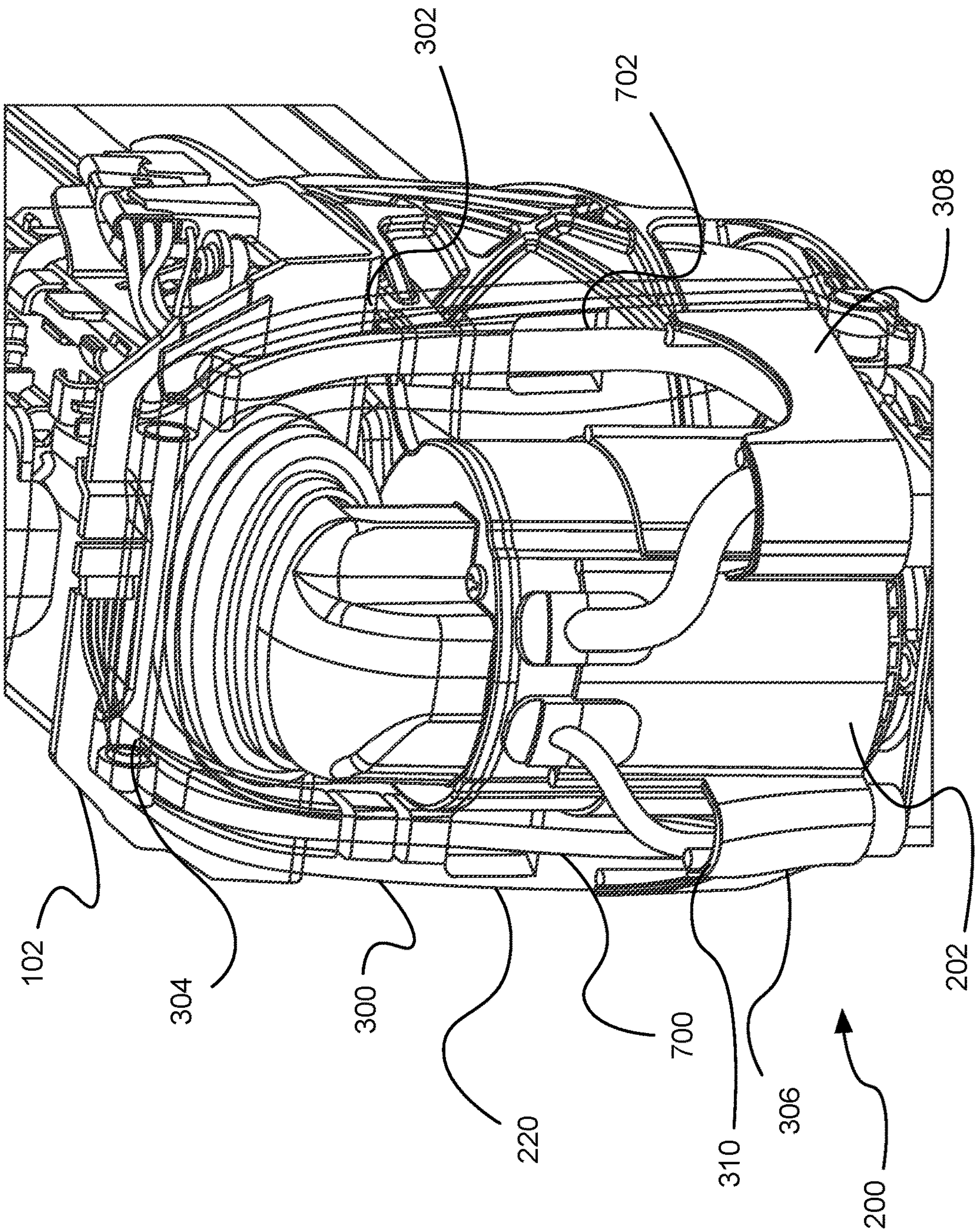
FIG. 3 shows a perspective partial cut away view of the power tool according to an example.
Figure 4:
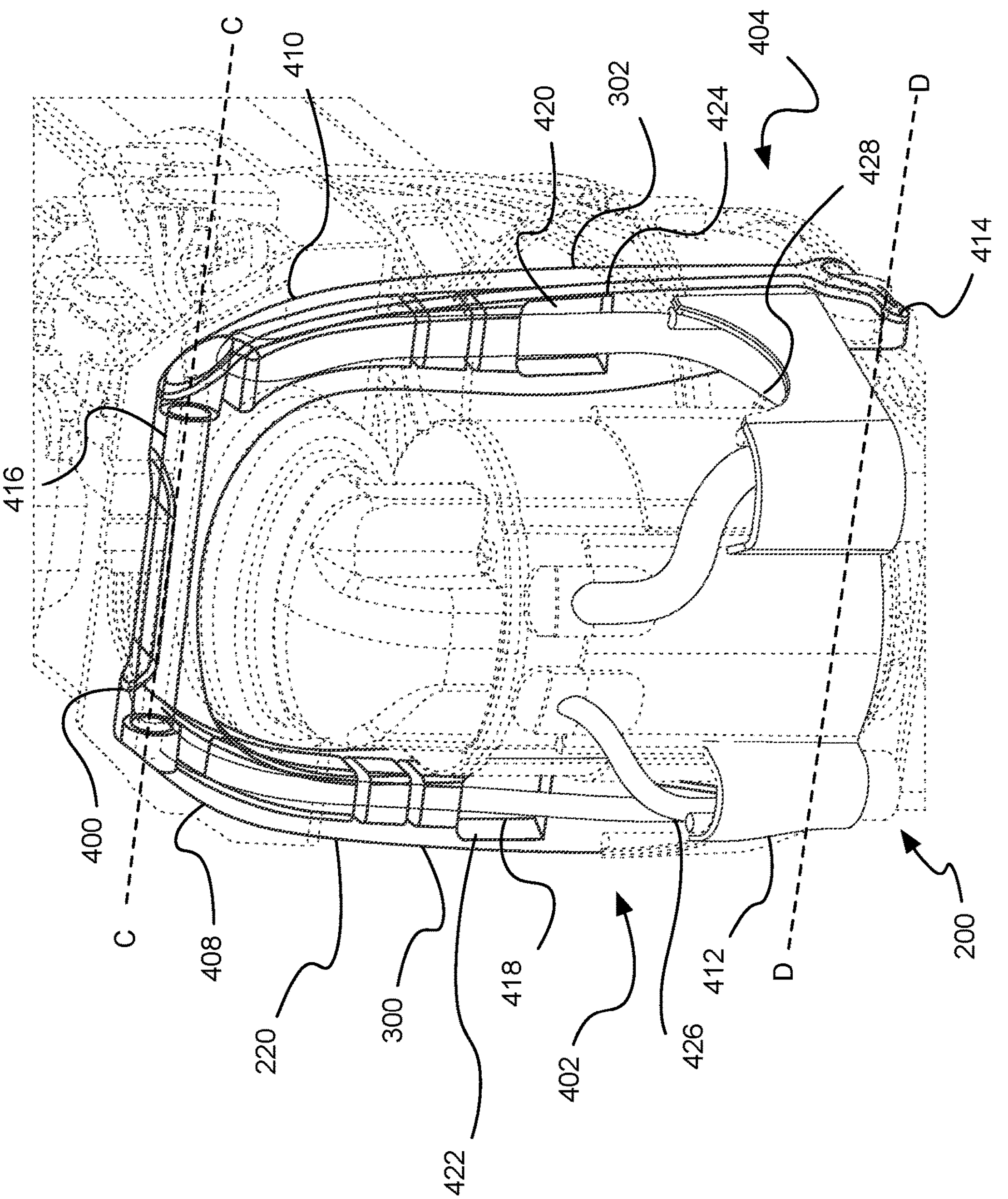
FIG. 4 shows a perspective partial cut away view of the power tool with a component emphasised according to an example.

Turning to FIGS. 3 and 4, the mounting frame 220 will now be described in more detail. FIG. 3 shows a perspective partial cut away view of the power tool 100. FIG. 4 shows a perspective partial cut away view of the power tool 100 with the mounting frame 220 emphasised.

FIG. 3 shows the mounting frame 220 mounted between the motor assembly 202 of the inner assembly 200 and the housing 102.

In some examples the mounting frame 220 comprises a first mounting arm 300 and a second mounting arm 302. Each of the first mounting arm 300 and the second mounting arm 302 are mounted between the motor assembly 202 and the housing 102.

FIG. 4 better shows the first mounting arm 300 and the second mounting arm 302. The first mounting arm 300 is mounted to a first side 402 of the inner assembly 200. Likewise, the second mounting arm 302 is mounted to a second side 404 of the inner assembly 200. The first and second sides 402, 404 of the inner assembly 200 are on opposite sides of the motor assembly 202. For example, FIGS. 1 and 2 show only the first side 402 of the inner assembly 200.

The first and second mounting arms 300, 302 of the mounting frame 220 are optionally connected together by a connecting portion 400 e.g. as shown in FIG. 4. In this way, both the first and second mounting arms 300, 302 are configured to move together in unison when the mounting frame 220 moves. In some other examples, the first and second mounting arms 300, 302 are separate components and the first and second mounting arms 300, 302 are not connected together via the connecting portion 400. In this case, the mounting frame 220 comprises a plurality of separate components (e.g. separate first and second mounting arms 300, 302) each separately mounted between the inner assembly 200 and the housing 102.

When the first and second mounting arms 300, 302 are connected together by the connecting portion 400, the first mounting arm 300, the second mounting arm 302 and the connecting portion 400 form a U-shaped mounting frame 220. In other examples, the first mounting arm 300, the second mounting arm 302 and the connecting portion 400 can form a mounting frame 200 having a fork configuration or a yoke configuration arranged to hold and guide the inner assembly 200 between the first and second positions.

As mentioned above, the first and second mounting arms 300, 302 are pivotally coupled to the housing 102 at respective first ends 408, 410 of the first and second mounting arms 300, 302. The respective first ends 408, 410 of the first and second mounting arms 300, 302 are pivotally mounted to the housing 102 about a first pivot axis C-C.

In some examples, the connecting portion 400 is hollow and comprises a central recess 416 in the housing 102. The central recess 416 is configured to receive a pivot rod 304 aligned with the first pivot axis C-C (best shown in FIG. 3). In this way, the connecting portion 400 retains the pivot rod 304 within the central recess 416 and is configured to pivot about the pivot rod 304. In some other examples, the pivot rod 304 is replaced with two pivot pins (not show) inserted at each end of the central recess 416 of the connecting portion 400.

The first and second mounting arms 300, 302 are pivotally coupled to the inner assembly 200 at respective second ends 412, 414 of the first and second mounting arms 300, 302. The respective second ends 412, 414 of the first and second mounting arms 300, 302 are pivotally mounted to the inner assembly 200 about a second pivot axis D-D. In some examples, the respective second ends 412, 414 of the first and second mounting arms 300, 302 are pivotally mounted to the motor housing 210. However, in alternative examples the respective second ends 412, 414 of the first and second mounting arms 300, 302 are pivotally mounted to any other part of the inner assembly 200 e.g. the hammer assembly housing 208.

FIG. 7 also shows a first and second pivot pin 724, 726 for respectively pivotally mounting the second ends 412, 414 of the first and second mounting arms 300, 302 to reciprocal recesses in the inner assembly 200 along the pivot axis D-D. In embodiments in which the respective second ends 412, 414 of the first and second mounting arms 300, 302 are pivotally mounted to the motor housing 210 it will be appreciated that the first and second pivot pins 724, 726 are respectively received in recesses of the motor housing 210.

The first pivot axis C-C and the second pivot axis D-D are parallel to each other.

Referring to FIG. 4 the mounting frame 220 comprises a first cable guide 418 for guiding at least part of the first cable 700 connected between the motor assembly 202 and a component, e.g. the motor controller 216 fixed relative to the housing 102.

As shown in FIGS. 3,4 and 7, the first mounting arm 300 comprises a first cable guide 418. Similarly, the second mounting arm 302 comprises a second cable guide 420. As shown in FIG. 7, the first and second cables 700, 702 are connected to the motor controller 216. In other examples, the first and second cables 700, 702 can be additionally or alternatively connected to one or other components of the power tool 100 e.g. a power controller, a battery etc.

In some examples, at least a portion of the first mounting arm 300 comprises a first cable guide 418. This means in some examples that the first cable guide 418 extends along a portion of the first mounting arm 300.

The first cable guide 418 comprises a first cable receiving portion 728 (best shown in FIG. 7) and a second cable receiving portion 422 (best shown in FIG. 4). The first cable receiving portion 728 and the second cable receiving portion 422 are the positions on the first cable guide 418 where the first cable 700 enters and exits the first cable guide 418.

FIG. 4 shows the second cable receiving portion 422 is a second cable guide hole 422 located between the first end 408 and the second end 412 of the first mounting arm 300. The second cable guide hole 422 is located on the first mounting arm 300 closer to the second pivot axis D-D than the first pivot axis C-C.

As shown in FIG. 7, the first cable guide 418 comprises a first cable receiving portion 728. The first cable receiving portion 728 as shown in FIG. 7 is a first cable guide hole 728 located between the first end 408 and the second end 412 of the first mounting arm 300. The first cable guide hole 728 is located on the first mounting arm 300 closer to the first pivot axis C-C than the second pivot axis D-D.

In this way the first cable guide hole 728 is provided in the first mounting arm 300 at a first position and the second cable guide hole 422 is provided in the first mounting arm 300 at a second position. The first position of the first cable guide hole 728 in the first mounting arm 300 is closer to the first pivot axis C-C part than the second position of the second cable guide hole 422 in the first mounting arm 300. Similarly, the second position of the second cable guide hole 422 in the first mounting arm 300 is closer to the second pivot axis D-D than the first position of the first cable guide hole 728 in the first mounting arm 300.

In the example shown in FIG. 7, the first cable receiving portion 728 is a first cable guide hole 422 located on or adjacent to the first pivot axis C-C. This can reduce the amount the first cable 700 moves due to the movement of the inner assembly 200 with respect to the housing 102 during use of the power tool 100. As discussed above, the second cable receiving portion 422 is a second cable guide hole 422 located near the midway of the first mounting arm 300. However, in some other examples, the second cable receiving portion 422 is a second cable guide hole 422 located on or adjacent to the second pivot axis D-D.

In some other examples, the first cable guide 418 extends along the entire length of the first mounting arm 300 or substantially along the entire length of the first mounting arm 300. In this example, the first cable receiving portion 728 is a first cable guide hole 422 located on or adjacent to the first pivot axis C-C and the second cable guide hole 422 is located on or adjacent to the second pivot axis D-D.

By integrating the first cable guide 418 in to the mounting frame 220, and directing the first cable 700 through the mounting frame 220, the first cable 700 is put under less stress during operation of the power tool 100 compared to the power cable of the prior art tool acknowledged in the background section. The operational lifetime of the power tool 100 is thus improved.

Similarly, in some examples, at least a portion of the second mounting arm 302 comprises a second cable guide 420. This means in some examples that the second cable guide 420 extends along a portion of the second mounting arm 302.

The second cable guide 420 comprises a first cable receiving portion 730 (best shown in FIG. 7) and a second cable receiving portion 424 (best shown in FIG. 4). Likewise, the first cable receiving portion 730 and the second cable receiving portion 424 of the second guide cable 420 are the positions on the second cable guide 420 where the second cable 702 enters and exits the second cable guide 420.

Similar to the first mounting arm 300, the second cable receiving portion 424 is a second cable guide hole 424 on the second mounting arm 302. The second cable guide hole 424 is located between the first end 410 and the second end 414. The first cable receiving portion 730 of the second cable guide 420 is a first cable guide hole 730 located on or adjacent to the first pivot axis C-C.

The arrangement of the second mounting arm 302 is the same as the first mounting arm 300. Indeed, the second mounting arm 302 can have any of the features or variations as discussed with respect to the first mounting arm 300.

By integrating the second cable guide 420 in to the mounting frame 220, and directing the second cable 702 through the mounting frame 220, the second cable 702 is put under less stress during operation of the power tool 100 compared to the power cable of the prior art tool acknowledged in the background section. The operational lifetime of the power tool 100 is thus improved.

Turning to FIG. 7, the first and second cable guides 418, 420 will be discussed in further detail. In some examples, the first and second cable guides 418, 420 are housed within the first and second mounting arms 300, 302. In this way, the first and second mounting arms 300, 302 comprise a first channel 712 and a second channel 714 for respectively receiving the first cable 700 and the second cable 702.

In some examples, the first channel 712 and the second channel 714 comprises a U-shaped cross-section. Optionally, the first cable guide 418 comprises at least one pair of opposing ribs 716 configured to grip the first cable 700. As shown in FIG. 7, there are a first pair of opposing ribs 716 and a second pair of opposing ribs 718. The first and second pairs of opposing ribs 716, 718 are sufficiently spaced apart to engage the first cable 700 with a friction fit. The first cable 700 can be pushed in to the first and second pairs of opposing ribs 716, 718 during manufacture. The first and second pairs of opposing ribs 716, 718 are configured to secure the first cable 700 within the first cable guide 418.

Whilst FIG. 7 only shows a first and second pair of opposing ribs 716, 718, there can be any number of opposing ribs 716, 718 located in the first cable guide 418. In some other examples, the first cable guide 418 does not have any opposing ribs. Instead, the U-shaped channel of the first cable guide 418 has a diameter which provides a friction fit with the first cable 700 along the entire length of the first cable guide 418. In some alternative examples, the opposing ribs are replaced with one or more cable clips, adhesive or any other suitable means for securing the first cable 700 to the first cable guide 418.

The second cable guide 420 is the same as with respect to the first cable guide 418. As shown in FIG. 7, the second cable guide 420 also optionally comprises first and second pairs of opposing ribs 720, 722 for gripping the second cable 702. Accordingly, the first and second pairs of opposing ribs 720, 722 for gripping the second cable 702 in the second cable guide 420 function in the same way as described in reference to the first cable guide 418.

In some examples, the first cable guide 418 and the second cable guide 420 are the same dimension to guide the same type of cable. However, in other examples the first cable guide 418 and the second cable guide 420 comprise different dimensions. As shown in FIG. 7, the second cable guide 420 is larger than the first cable guide 418. This is because the second cable 702 comprises a larger diameter than the first cable 700 e.g. the second cable 702 comprises more or thicker second wires 710.

In some other examples, the second cable guide 420 is smaller than the first cable guide 418. For example, the second cable 702 comprises a smaller diameter than the first cable 700 e.g. the second cable 702 comprises fewer or thinner second wires 710.

In some examples, the inner assembly 200 comprises at least one first cable restraint 306 configured to restrict movement of the first cable 700. As shown in FIG. 3, a first cable restraint 306 is mounted to the motor housing 210 on a first side 402 of the inner assembly 200. In other examples, the first cable restraint 306 is mounted to another part of the inner assembly 200 e.g. the hammer assembly 206.

The first cable restraint 306 is configured to restrict movement of the first cable 700 away from the motor assembly 202. In some examples, the first cable restraint 306 is configured to restrict movement of the first cable 700 in a direction parallel with the first or second pivot axes C-C, D-D. This means that the first cable 700 can still move with respect to inner assembly 200 when the inner assembly 200 moves between the first and second positions. In other words, the first cable 700 is permitted to move in a plane perpendicular to the first or second pivot axes C-C, D-D. However, the first cable 700 is kept adjacent to the motor housing 210 or in engagement with the motor housing 210.

The first cable restraint 306 comprises at least one surface configured to limit movement of the first cable 700 away from the motor housing 210. The first cable restraint 306 comprises a first guide housing 310 mounted on the motor housing 210 and defining a space between the first guide housing 310 and the motor housing 210 for receiving the first cable 700.

A second cable restraint 308 is also mounted on the motor housing 210 on a second side 404 of the inner assembly 200. The second cable restraint 308 is the same as the first cable restraint 306. Similar to the first cable restraint 306, the second cable restraint 308 is configured to restrict movement of the second cable 702 and may be mounted to another part of the inner assembly 200 e.g. the hammer assembly 206.

As shown in FIGS. 3 and 4, first and second midportions 426, 428 of the first cable 700 and the second cable 702 are restrained respectively by the first and second cable restraints 306, 308. The first and second cables 700, 702 are folded over in the first and second midportions 426, 428 and movement of at least a portion of the folded first and second midportion 426, 428 of the first and second cables 700, 702 is restricted by the first and second cable restraints 306, 308. In this way, the first and second cable restraints 306, 308 guide the first and second cables 700, 702 respectively through a U-shaped bend.

This is advantageous because the U-shaped bend in the first and second cable 700, 702, means that the first and second cables 700, 702 inherently have a shape that absorbs at least some of the movement of the inner assembly 200 relative to the housing 102 in use. This means that other parts of the first and second cable 700, 702 e.g. the soldered terminals will undergo less wear due to the vibration and shock of the power tool 100 during operation.

Whilst FIGS. 3 and 4 show a certain arrangement for the first and second cable restraints 306, 308, the first and second cable restraints 306, 308 can comprise any suitable form and shape in order to limit movement of the first and second cable 700, 702 away from the motor housing 210. For example, the first and second cable restraint 306, 308 can alternatively be a curved open channel (not shown) and the first and second cables 700, 702 wrap around the outside of the curved open channel. Alternatively, the first and second cable restraints 306, 308 can be one or more clips, hooks, or loops for loosely engaging the first and second cables 700, 702 near the motor housing 210.

As shown in FIGS. 4 and 7, the first and second cable guides 418, 420 are internal within at least part of the first and second mounting arms 300, 302. In some alternative examples, the mounting frame 220 comprises a cable guide mounted on the exterior of the mounting frame 220. For example, the mounting frame 220 comprises a plurality of cable clips, cable ties, glue, adhesive, or any other fastening means (not shown) on an exterior surface of the mounting frame 220 configured to fix at least part of the cable to the mounting frame 220.

Reference will now be made to FIGS. 5 and 6. FIG. 5 shows a close-up cross-sectional front view of the power tool 100 in a first position. The first position of the inner assembly 200 is in a position whereby the inner assembly 200 is closer to a lower portion X of the housing 102 (as marked on FIGS. 5 and 6). FIG. 6 shows a close-up cross sectional front view of the power tool 100 in a second position. The second position of the inner assembly 200 is a position whereby the inner assembly 200 is further away from the lower portion X of the housing 102.

FIGS. 5 and 6 show the cut away section of the power tool 100 represented by the dotted box B in FIG. 1. The cut away section as shown in FIGS. 5 and 6 does not show some parts of the housing 102 for the purposes of clarity.

In use of the power tool 100 the inner assembly 200 is caused to move with respect to the housing 102 between the first position and the second position. The first end 408 of the first mounting arm 300 pivots with respect to the housing 102 about pivot axis C while the second end 412 of the first mounting arm 300 pivots with respect to the inner assembly 200 about pivot axis D. At the same time the first end 410 of the second mounting arm 302 pivots with respect to the housing 102 about pivot axis C while the second end 414 of the second mounting arm 302 pivots with respect to the inner assembly 200 about pivot axis D. This means that the inner assembly 200 oscillates through an arc between the first and second positions.

At least a portion of the first cable 700 is kept fixed with respect to the first mounting arm 300 since the first cable guide 418 keeps the first cable 700 in place. However, as discussed above, the first cable 700 exits the first cable guide 418 and is then guided by the first cable restraint 306. The midportion 426 of the first cable 700 is held in position near the motor housing 210. The arrangement as shown in FIGS. 5 and 6 permits other portions of the first cable 700 to move as the mounting frame 220 moves between the first and second positions of the inner assembly 200.

It will be appreciated that whilst various aspects and embodiments have heretofore been described, the scope of the present invention is not limited thereto and instead extends to encompass all arrangements, and modifications and alterations thereto, which fall within the spirit and scope of the appended claims.

For example, with reference to FIG. 7, there is a first and a second cable 700, 702 connected between the motor assembly 202 and the motor controller 216. However, in some alternative arrangements there is a single first cable 700 connected between the motor assembly 202 and the motor controller 216. In this case, the single connected cable also comprises a bundle of wires comprising both data and power connections.

In the illustrated embodiment the first and second mounting arms 300, 302 of the mounting frame 220 are configured to guide a cable however in other embodiments only one such arm may be configured to guide a cable.

In some arrangements the mounting frame 220 comprises only a single mounting arm, such as the first mounting arm 300 or the second mounting arm 302 heretofore described, which is coupled between the inner assembly 200 and the housing 102. In arrangements where the mounting frame 220 only has the first mounting arm 300, the first mounting arm 300 is only coupled between the housing 102 and the inner assembly 200 on the first side 402 of the inner assembly 200. In arrangements where the mounting frame 220 only has the second mounting arm 302 the second mounting arm 302 is only coupled between the housing 102 and the inner assembly 200 on the second side 404 of the inner assembly 200.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:

a housing;

an inner assembly mounted at least partially within the housing and configured to move between a first position and a second position with respect to the housing, the inner assembly comprising a motor assembly; and a mounting frame configured to guide the inner assembly between the first position and the second position and having a cable guide configured to guide at least part of a cable connected between the motor assembly and a component fixed relative to the housing, wherein the mounting frame includes at least one mounting arm that pivotably supports the inner assembly within the housing, the at least one mounting arm including a first pivot part adjacent a first end thereof pivotably mounted to the housing and a second pivot part adjacent a second end thereof pivotably mounted to the inner assembly, wherein the cable guide includes a cable receiving portion formed through the at least one mounting arm;

wherein the cable receiving portion includes a first cable receiving portion provided in the mounting frame at a first position and a second cable receiving portion provided the mounting frame at a second position; wherein the first position is closer to the first pivot part than the second position; and the second position is closer to the second pivot part than the first position.

2. The power tool of claim 1, wherein the cable guide extends at least partially along the mounting frame.

3. The power tool of claim 1, wherein the cable guide is a channel defined by the mounting frame.

4. The power tool of claim 3, wherein the cable guide comprises at least one pair of opposing ribs configured to grip the cable.

5. The power tool of claim 1, wherein the first position is provided adjacent the first pivot part of the mounting frame and the second position is provided adjacent the second pivot part of the mounting frame.

6. The power tool of claim 1, wherein the at least one mounting arm comprises a first mounting arm mounted to a first side of the inner assembly and a second mounting arm mounted to a second side of the inner assembly.

7. The power tool of claim 1, wherein the inner assembly comprises at least one cable restraint configured to restrict movement of the cable, wherein the at least one cable restraint is mounted on the motor assembly.

8. The power tool of claim 7, wherein the at least one cable restraint defines a surface configured to limit movement of the cable away from the motor assembly.

9. The power tool of claim 7, wherein the at least one cable restraint is configured to guide the cable through a U-shaped bend.

10. The power tool of claim 1, wherein the component to which the cable is connected is a motor controller.

11. The power tool of claim 1, wherein the motor assembly is operatively coupled to a hammer mechanism connectable to a tool bit, the hammer mechanism being configured to drive the tool bit.

12. The power tool of claim 1, wherein the power tool is a demolition hammer.

* * * * *